United States Patent
Seebacher

(10) Patent No.: US 9,941,983 B1
(45) Date of Patent: Apr. 10, 2018

(54) METHOD AND APPARATUS FOR TESTING A WIRELESS DEVICE

(71) Applicant: Rohde & Schwarz GmbH & Co. KG, München (DE)

(72) Inventor: Pirmin Seebacher, Rosenheim (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 15/287,842

(22) Filed: Oct. 7, 2016

(51) Int. Cl.
*H04B 17/00* (2015.01)
*H04W 24/06* (2009.01)

(52) U.S. Cl.
CPC ........ *H04B 17/0085* (2013.01); *H04W 24/06* (2013.01)

(58) Field of Classification Search
CPC .................................................. H04L 12/2697
USPC ..................................... 455/423, 67.13, 67.11
See application file for complete search history.

(56) References Cited

U.S. PATENT DOCUMENTS

| | | | |
|---|---|---|---|
| 8,731,493 B2 * | 5/2014 | Luong ................... | H04L 43/024 455/115.2 |
| 8,954,014 B2 * | 2/2015 | Kyosti ............... | G01R 29/0814 370/310 |
| 2006/0012388 A1 * | 1/2006 | Lin ........................ | H04W 24/00 324/754.08 |
| 2007/0159199 A1 * | 7/2007 | Talwar ................... | H04B 17/00 324/754.31 |
| 2007/0254643 A1 * | 11/2007 | Garcia ................. | H04L 1/1867 455/423 |
| 2011/0200094 A1 * | 8/2011 | Kalra ...................... | H04L 69/24 375/240.01 |
| 2013/0052962 A1 * | 2/2013 | Hansen .............. | G01R 29/0871 455/67.12 |
| 2014/0078973 A1 * | 3/2014 | Kazmi .................... | H04W 8/22 370/329 |
| 2014/0087668 A1 * | 3/2014 | Mow ..................... | H04W 24/00 455/67.14 |

* cited by examiner

*Primary Examiner* — Tilahun B Gesesse
(74) *Attorney, Agent, or Firm* — Shumaker & Sieffert, P.A.

(57) ABSTRACT

A test apparatus for testing a wireless device, said test apparatus comprising a transceiver unit adapted to communicate with said device under test, DUT, via a wireless link; a processing unit adapted to control said transceiver unit and to detect a communication service used by said device under test, DUT, during communication with said transceiver unit; and an output unit adapted to output the communication service detected by said processing unit.

17 Claims, 4 Drawing Sheets

METHOD AND APPARATUS FOR TESTING A WIRELESS DEVICE

TECHNICAL FIELD

The invention relates to a method and apparatus for testing a wireless device, in particular a wireless communication device.

TECHNICAL BACKGROUND

Communication devices such as mobile phones, tablets, laptops or modem devices are operated to provide a communication service for a user. A communication device can provide different communication services to a user. The communication services provided by the communication device have to fulfill different requirements concerning inter alia spectrum efficiency, mobility, latency, convection density, network energy efficiency, area traffic capacity, peak data rate or user experience data rate. Different kinds of communication services can be clustered in generic service groups fulfilling similar or identical communication requirements. During operation, a communication device such as a wireless communication device can provide different communication services which can influence operation parameters of the device such as the battery lifetime of a mobile wireless communication device.

Accordingly, there is a need to provide a method and apparatus for testing the impact of communication services provided by a wireless device on operation parameters of the respective device.

SUMMARY OF THE INVENTION

The invention provides according to a first aspect a test apparatus for testing a wireless device,
said test apparatus comprising:
a transceiver unit adapted to communicate with the device under test via a wireless link;
a processing unit adapted to control said transceiver unit and to detect a communication service used by said device under test during communication with the transceiver unit; and
an output unit adapted to output the communication service detected by the processing unit.

In a possible embodiment of the test apparatus according to the first aspect of the present invention, the communication service is a 5G communication service.

In a possible embodiment of the test apparatus according to the first aspect of the present invention, the communication service used by the device under test comprises an enhanced mobile broadband communication service, a massive machine-type communication service and an ultrareliable machine-type communication service.

In a further possible embodiment of the test apparatus according to the first aspect of the present invention, the test apparatus comprises an anechoic chamber adapted to receive the device under test.

In a still further possible embodiment of the test apparatus according to the first aspect of the present invention, the transceiver unit of the test apparatus is connected to at least one antenna located within said anechoic chamber to communicate with the device under test via the wireless link.

In a further possible embodiment of the test apparatus according to the first aspect of the present invention, an interior surface of the anechoic chamber is covered with radiation absorbent material.

In a further possible embodiment of the test apparatus according to the first aspect of the present invention, the processing unit of said test apparatus is adapted to emulate a base station during communication with said device under test via the wireless link.

In a still further possible embodiment of the test apparatus according to the first aspect of the present invention, the processing unit of the test apparatus is adapted to emulate another device under test during communication with said device under test.

In a still further possible embodiment of the test apparatus according to the first aspect of the present invention, the wireless link is a bidirectional wireless link comprising an uplink communication link connecting a transmitter of said device under test with the transceiver unit of said test apparatus and a downlink communication link connecting the transceiver unit of said test apparatus with a receiver of said device under test.

In a still further possible embodiment of the test apparatus according to the first aspect of the present invention, the processing unit of said test apparatus is adapted to detect a sequence of different communication services used by the device under test during communication with the transceiver unit of said test apparatus.

In a still further possible embodiment of the test apparatus according to the first aspect of the present invention, the processing unit of the test apparatus is adapted to control the transceiver unit of said test apparatus and/or the device under test to trigger changes of the communication services used by the device under test during communication with the transceiver unit.

In a still further possible embodiment of the test apparatus according to the first aspect of the present invention, the processing unit of said test apparatus is adapted to monitor an operation mode and/or at least one operation parameter of the device under test depending on the detected sequence of different communication services used by said device under test during communication with the transceiver unit of said test apparatus.

In a possible embodiment of the test apparatus according to the first aspect of the present invention, the operation parameter of the device under test comprises a battery lifetime of a battery providing a power supply for the device under test.

In a still further possible embodiment of the test apparatus according to the first aspect of the present invention, the processing unit of the test apparatus is adapted to detect communication protocols of the communication services used by the device under test during communication with the transceiver unit of said test apparatus.

In a still further possible embodiment of the test apparatus according to the first aspect of the present invention, messages or packets transmitted via the wireless link according to the communication protocols of the communication services used by the device under test during communication with the transceiver unit of said test apparatus comprise at least one service indication data field indicating the used communication service.

In a still further possible embodiment of the test apparatus according to the first aspect of the present invention, the processing unit of the test apparatus is adapted to extract the data content of the at least one service indication data field to detect the used communication service.

In a still further possible embodiment of the test apparatus according to the first aspect of the present invention, the output unit of the test apparatus is adapted to output and/or to register the detected communication services and/or the monitored operation modes and/or monitored operation parameters of the device under test during communication of the device under test with the transceiver unit of said test apparatus.

In a further possible embodiment of the test apparatus according to the first aspect of the present invention, a communication frequency used by the communication service is in a frequency range of 28 GHz to 30 GHz.

In a further possible embodiment of the test apparatus according to the first aspect of the present invention, a communication bandwidth used by the communication service is in a range of 800 MHz to 3 GHz.

The invention further provides according to a second aspect a method for testing a wireless device comprising the steps of:

communicating with the device under test via a wireless link;

detecting a communication service used by the device under test during communication via the wireless link; and outputting the detected communication service.

In a possible embodiment of the method according to the second aspect of the present invention, the communication service is a 5G communication service comprising an enhanced mobile broadband communication service, and/or a massive machine-type communication service and/or an ultrareliable machine-type communication service.

In a possible embodiment of the method according to the second aspect of the present invention, the communication frequency used by the communication service is in a frequency range of 28 GHz to 30 GHz.

In a still further possible embodiment of the method according to the second aspect of the present invention, the communication bandwidth used by the communication service is in a range of 800 MHz to 3 GHz.

BRIEF DESCRIPTION OF FIGURES

In the following, different aspects of the present invention are described in more detail with reference to the enclosed figures.

DETAILED DESCRIPTION OF EMBODIMENTS

Figure 1:
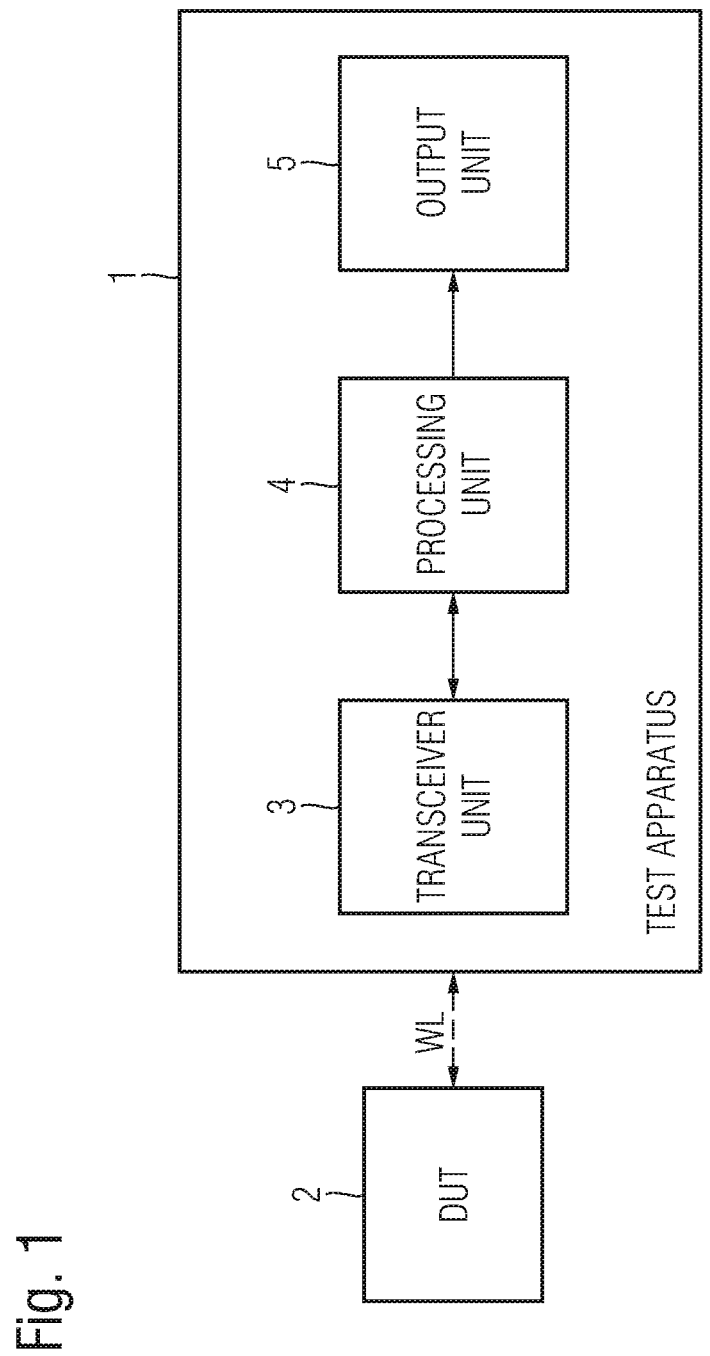
FIG. 1 shows a block diagram of a possible exemplary embodiment of a test apparatus according to the first aspect of the present invention.

As can be seen in FIG. 1, a test apparatus 1 according to the first aspect of the present invention is adapted to test a wireless device 2. The test apparatus 1 comprises in the illustrated embodiment a transceiver unit 3, a processing unit 4 and an output unit 5. As shown in FIG. 1, the transceiver unit 3 is adapted to communicate with the device under test 2 via a wireless link WL. The processing unit 4 is configured to control the transceiver unit 3 and to detect a communication service CS used by the device under test 2 during communication with the transceiver unit 3. The output unit 5 of the test apparatus 1 is adapted to output the communication service detected by the processing unit 4.

The device under test 2 is in a possible embodiment a wireless communication device which can communicate via a bidirectional wireless link WL with the transceiver unit 3 of the test apparatus 1. The communication device 2 can in a possible embodiment comprise a mobile communication device such as a mobile phone or a laptop. The bidirectional wireless link WL between the device under test 2 and the transceiver unit 3 can comprise an uplink communication link connecting a transmitter of the device under test 2 with the transceiver unit 3 of the test apparatus 1 and a downlink communication link connecting the transceiver unit 3 of the test apparatus 1 with a receiver of the device under test 2. The processing unit 4 of the test apparatus 1 is configured in a possible embodiment to detect a sequence of different communication services CS used by the device under test 2 during communication with the transceiver unit 3 of the test apparatus 1. In a possible embodiment, the processing unit 4 comprises a controller adapted to control the transceiver unit 3 of the test apparatus 1 to trigger changes of the communication services used by the device under test 2 during communication with the transceiver unit 3. In a further embodiment, the controller of the processing unit 4 of the test apparatus 1 is further adapted to control also the device under test 2 to trigger changes of the communication services used by the device under test 2 during communication with the transceiver unit 3. The processing unit 4 can further monitor an operation mode and/or at least one operation parameter of the device under test 2 depending on the detected sequence of different communication services used by the device under test 2 during communication with the transceiver unit 3. The operation parameters monitored by the processing unit 4 can for instance comprise a battery lifetime of a battery providing a power supply to the device under test 2.

The processing unit 4 can comprise in a possible implementation at least one microprocessor. The processing unit 4 is adapted in a possible implementation to detect communication protocols of the communication services CS used by the device under test 2 during communication with the transceiver unit 3 of the test apparatus 1. Messages or packets transmitted via the wireless link WL according to the communication protocols of the communication services used by the device under test 2 during communication with the transceiver unit 3 of the test apparatus 1 can comprise in a possible embodiment at least one service indication data field SIDF indicating the used communication service SCS. In a possible embodiment, the service indication data field SIDF can form part of a header of a message or packet transmitted via the wireless link WL. In a possible embodiment, the processing unit 4 is adapted to extract the data content of the at least one service indication data field SIDF to detect the used communication service CS. The output unit 5 of the test apparatus 1 is adapted to output and/or to register the detected communication services CS. Further, the output unit 5 can be adapted to output the monitored operation modes and/or monitored operation parameters of the device under test 2 during communication of the device under test 2 with the transceiver unit 3.

In a possible embodiment, the communication frequency used by the communication service CS can be in a frequency range of 28 GHz to 30 GHz. The communication bandwidth used by the communication service can be in a range of 800 MHz to 3 GHz.

In a possible embodiment, the communication service CS used by the device under test 2 is a 5G communication service. This 5G communication service can comprise an enhanced mobile broadband communication service, a massive machine-type communication service and/or an ultrareliable machine-type communication service.

Machine-type communication MTC relates to wireless communication between devices not directly operated by humans such as sensors, actuators, physical objects or embedded controllers. Massive machine-type communication services refer to services where a large number of sensors can monitor certain events or some kind of system state. For instance, massive machine-type communication services can be used in a wide range of applications comprising e.g. logistics or smart city monitoring. In massive machine-type communication services, data transfers for a device under test 2 are typically infrequent and comprise relaxed delay requirements. At the same time, scalable and energy-efficient communication is required which can support concentrations of massive numbers of devices in some areas. Further, the devices have to operate with integrated batteries for long time periods.

In contrast, ultrareliable machine-type communication services refer to services which provide a very high reliability and short latencies. Accordingly, ultrareliable machine-type communication services are also suitable for safety-critical applications. Ultrareliable machine-type communication services can for instance be used for real time control in automated cyber-physical systems such as industrial process control. Ultrareliable machine-type communication services can also be used for a device-to-device communication, for instance in cooperative intelligent transport systems.

In contrast to machine-type communication MTC enhanced mobile broadband communication services require a high peak data rate and a high user experience data rate. The enhanced mobile broadband communication services used by the device under test 2 can deliver in a possible embodiment up to 10 Gbit/sec peak data throughput and 1 Gbit/sec throughput when the device under test 2 is moving. In a possible embodiment, enhanced mobile broadband services employ millimeter waves and massive MIMO. MIMO allows a communication system to use a signal spectrum more efficiently by employing spatial multiplexing and beamforming. With spatial multiplexing, a base station can use multiple transmit antennas to beam distinct streams of information to multiple users at the same time using the same signal spectrum. In a possible embodiment, the device under test 2 be tested by the test apparatus 1 comprises a high number of antennas of a massive MIMO system. In a possible implementation, the device under test 2 and the associated transceiver unit 3 of the test apparatus 1 comprise a high number of transmit and receive antennas. In a possible implementation, both the device under test 2 and the transceiver unit 3 comprise more than 100 transmit and receive antennas of a massive MIMO antenna system.

In a possible embodiment, the processing unit 4 of the test apparatus 1 is adapted to emulate a base station during communication with the device under test 2 via the wireless link. In a further possible embodiment, the processing unit 4 of the test apparatus 1 is adapted to emulate another device under test 2' during communication with the device under test 2 via the wireless link WL. The test apparatus 1 can monitor the communication behavior of the device under test 2 when emulating a base station or when emulating another device under test 2. A controller of the processing unit 4 is adapted to control the transceiver unit 3 to trigger changes of the communication services CS used by the device under test 2 during communication of the transceiver unit 3. In this way, the test apparatus 1 is adapted to monitor the communication behavior of the device under test 2 when emulating a base station and/or when emulating another device under test 2. Further, the processing unit 4 can monitor the operation mode and operation parameters of the device under test 2 depending on the sequence of different communication services CS used by the device under test 2. In a possible implementation, the processing unit 4 is adapted to detect communication protocols of communication services used by the device under test 2 during communication with the transceiver unit 3 of the test apparatus 1. These communication protocols can comprise in a possible embodiment internet of things, IoT, communication protocols.

Figure 2:
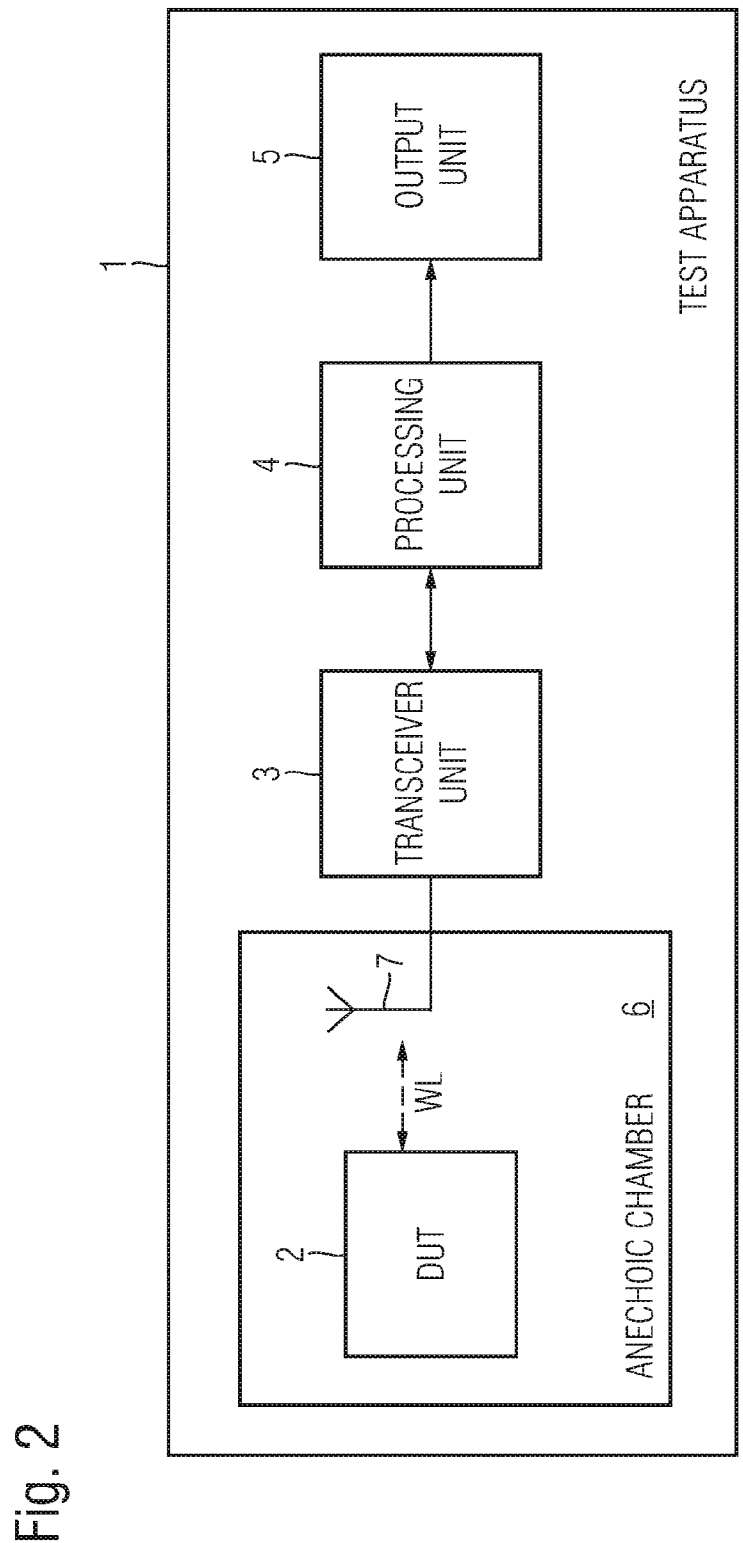
FIG. 2 shows a block diagram of a further possible exemplary embodiment of a test apparatus according to the first aspect of the present invention.

FIG. 2 shows a block diagram of a further possible embodiment of a test apparatus 1 according to the first aspect of the present invention. In the illustrated embodiment, the test apparatus 1 further comprises an anechoic chamber 6 adapted to receive the device under test 2. The transceiver unit 3 of the test apparatus 1 is connected to at least one antenna 7 located within the anechoic chamber 6 to communicate with the device under test 2 via a wireless link WL. In a possible embodiment, the interior surface of the anechoic chamber 6 can be covered with radiation absorbent material. In a possible embodiment, the transceiver unit 3 is connected to a plurality of transmit and receive antennas 7 of a MIMO antenna system to communicate with the device under test 2 via a wireless link WL. The size of the anechoic chamber depends on the size of the device under test 2 to be tested by the test apparatus 1. The radiation absorbent material is adapted to absorb incident radiation as effectively as possible from as many incident directions as possible. In a possible embodiment, the surface structure of the interior surface of the anechoic chamber is adapted to absorb signals comprising a frequency between 28 GHz to 30 GHz. In a possible implementation, the interior surface of the anechoic chamber 6 comprises a pyramidal radiation absorbent material to absorb effectively RF radiation.

In a possible embodiment, the anechoic chamber 6 as illustrated in FIG. 2 is integrated in the test apparatus 1. In an alternative preferred embodiment, the transceiver unit 3 of the test apparatus 1 can be connected via an interface to an anechoic chamber 6. In a possible implementation, the anechoic chamber 6 is replaceable to receive and test different kinds of devices 2.

Figure 3:
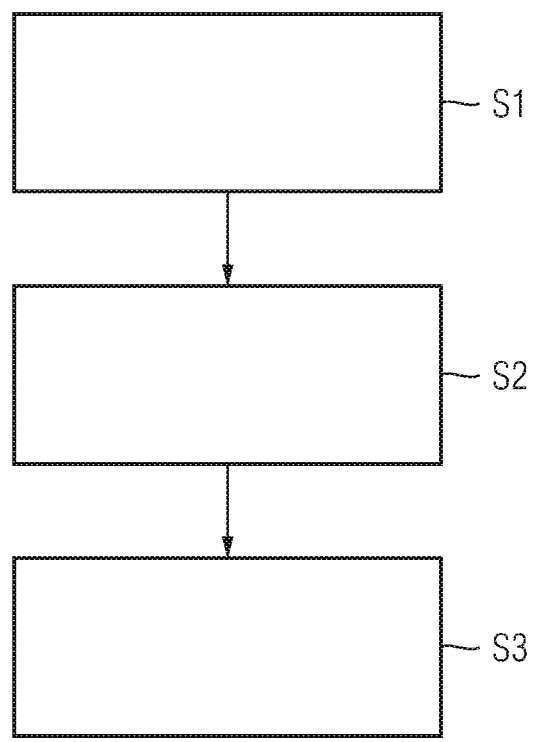
FIG. 3 shows a flowchart of a possible exemplary embodiment of a method for testing a wireless device according to the second aspect invention.

FIG. 3 shows a flowchart for illustrating a possible embodiment of a method for testing a wireless device 2 according to the second aspect of the present invention. In a first step S1, a communication with the device under test 2 via a wireless link WL is initiated. The processing unit 4 can control the transceiver unit 3 to communicate with the device under test 2 via the wireless WL.

In a further step S2, a communication service CS used by the device under test 2 during the communication is detected.

In a further step S3, the detected communication service CS is output by the test apparatus 1 via an output unit.

The detected communication service CS can comprise a 5G communication service including an enhanced mobile broadband communication service, a massive machine-type communication service and/or an ultrareliable machine-type communication service. The communication frequency used by the communication service CS is in a possible embodiment in a frequency range of 28 GHz to 30 GHz. Further, the communication bandwidth used by the communication service CS can be in a range of 800 MHz to 3 GHz.

Figure 4:
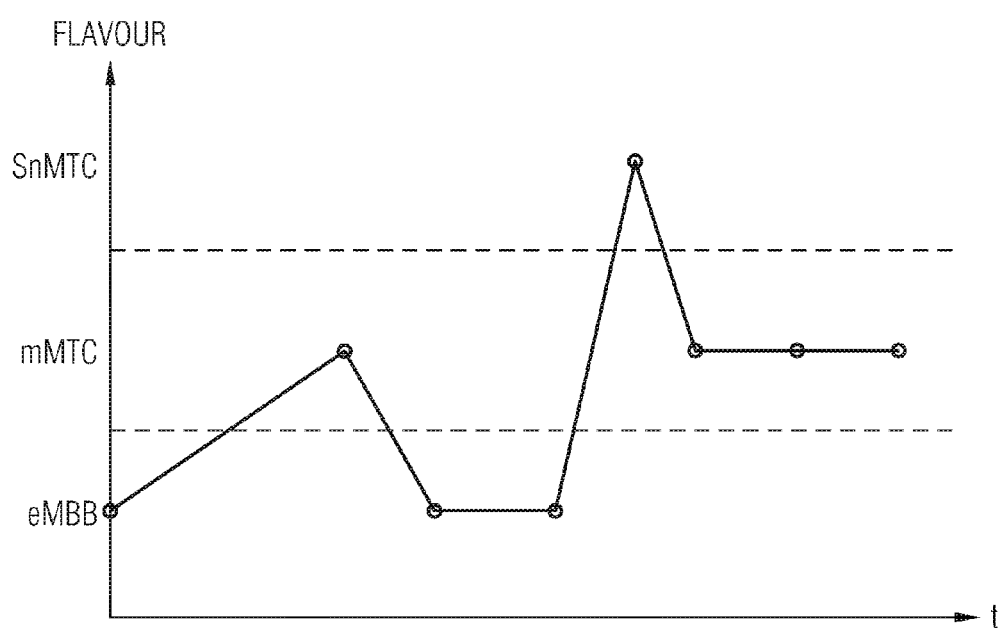
FIG. 4 shows a diagram for illustrating the operation of a test apparatus according to the first aspect of the present invention.

FIG. 4 shows a diagram illustrating changes between different types of 5G communication services used by the device under test 2. As can be seen, the device under test 2 can change the used communication services or flavors over time t. In the illustrated embodiment, the device under test 2 uses enhanced mobile broadband communication service CS eMBB, message machine-type communication services mMTC and an ultrareliable machine-type communication service SuMTC. The enhanced mobile broadband communication services eMBB provide a high data throughput of e.g. 10 Gbit/sec. In the illustrated example of FIG. 4, the device under test 2 switches from an enhanced mobile broadband communication service eMBB to a massive machine-type communication services mMTC which may for instance have a lower power consumption. In the illustrated example, the device under test 2 then switches back to enhanced mobile broadband communication services eMBB. Then, the device under test 2 switches to an ultrareliable machine-type communication service UMTC and from there back to a massive type communication service mMTC. In a possible embodiment, the switching between different types of communication services CS can be triggered by a control unit of the device under test 2. Further, the switching between different types of communication services CS can also be triggered by a control entity or controller of the processing unit 4 of the test apparatus 1. In a possible embodiment, the test apparatus 1 comprises different test operation modes. In a first test operation mode, switching between different kinds of communication services used by the device under test 2 is controlled by the control unit of the device under test 2. In the other test operation mode, switching between the different communication services CS is done under the control of a control entity of the processing unit 4.

In a possible embodiment, the device under test 2 such as a wireless communication device can comprise sensors which are adapted to measure parameters including environmental parameters such as temperature t or pressure P. The measured parameters can influence the communication behavior of the device under test 2. In a possible embodiment, the device under test 2 can switch between different kinds of communication services CS depending on the sensed environmental parameters which provide a pattern of different flavors or communication services as illustrated for instance in FIG. 4. In a possible embodiment, the test apparatus 1 is adapted to detect the pattern of communication services used by the device under test 2 during communication with the test apparatus 1. The detected pattern of communication services CS can be registered and/or output by the test apparatus 1 via an output unit 5. In a possible embodiment, the output unit 5 comprises a display adapted to output the monitored communication services CS used by the device under test 2.

Besides external environmental influences, also internal operation parameters can have an impact of the communication behavior of the device under test 2. Such an operation parameter can comprise for instance a measured battery status of a battery providing power supply for the device under test 2. The battery status or charge status of the battery can be monitored internally by a monitoring unit of the device under test 2 and signaled to an internal controller of the device under test 2. The controller of the device under test 2 can change the communication service CS used during communication depending on the battery status. If the battery status indicates that the battery is almost empty or that the charging state falls beneath a predetermined threshold the controller of the device under test 2 can trigger a change from a first communication service CS1 consuming much electrical power to another communication service CS2 consuming less electrical power. In a possible embodiment, the processing unit 4 of the test apparatus 1 is adapted to monitor this mind of changes of the communication service CS during the communication with the device under test.

In a still further possible embodiment, the test apparatus 1 is connected via an interface to the device under test 2 to receive internal data relating to operation parameters of the device under test 2. For instance, the test apparatus 1 can monitor in a possible implementation also the operation state of the battery or power supply source integrated in the device under test 2 during communication with the test apparatus 1. For instance, the test apparatus 1 can emulate in a possible embodiment a base station communicating with the device under test 2 and monitor one or several operation parameters of the device under test 2 such as the battery state of the battery integrated in the device under test 2 during communication with the emulated base station. In a still further possible embodiment, the processing unit 4 of the test apparatus 1 is further adapted to control external or environmental parameters OPext during the communication with the device under test 2. For instance, in the embodiment illustrated in FIG. 2, the processing unit 4 may control in a possible implementation a temperature T and/or a pressure P within the anechoic chamber 6 during communication to monitor an impact of these external influences on the communication behavior of the device under test 2 during communication with the transceiver unit 3. In a further possible embodiment, the processing unit 4 can further monitor the impact of external operation parameters OPext such as temperature T or pressure P on internal operation parameters OPint of the device under test 2 such as the battery state and simultaneously observe the status or communication types used by the device under test 2 during communication. The processing unit 4 of the test apparatus 1 can be configured in a possible embodiment to perform an analysis of the received data, i.e. the observed operation parameters OP of the device under test 2 and the communication services CS used by the device under test 2 during communication with the transceiver unit 3. In a possible embodiment, the processing unit 4 can be adapted to calculate correlations between operation parameters OP of the device under test 2 and the communication services CS used by the device under test 2 during communication with the transceiver unit 3. In a possible embodiment, the processing unit 4 can trigger changes between different kinds of communication services CS to monitor or observe the impact of these changes on specific operation parameters OP of the device under test 2. During these measurements, the test apparatus 1 can further change external influences or operation parameters OPext in the environment of the device under test 2, for instance by decreasing or increasing the temperature T within the test chamber 6 of the test apparatus 1. For instance, the test apparatus 1 may simulate a communication using an enhanced mobile broadband communication service at a very low or very high temperature. Further, the control entity of the processing unit 4 may simulate a massive machine-type communication mMTC service and/or an ultrareliable machine-type communication uMTC service at a very low or very high temperature. In this way, the test apparatus 1 can test whether the device under test 2 provides a communication which is robust against environmental influences.

In a still further possible embodiment of the test apparatus 1, the control entity of the processing unit 4 can control the antennas 7 of a massive MIMO antenna system during communication with the device under test 2. In a possible embodiment, the processing unit 4 can control the number of antennas 7 used by the MIMO system during communication with the device under test 2. In this way, the test apparatus 1 can detect the impact of a changing number of transmit and/or receive antennas on the communication behavior of the device under test 2. Further, if the device under test 2 is connected via a data interface to the processing unit 4 during the communication test, the processing unit 4 can further monitor the impact of the varying numbers of communication antennas 7 on internal operation parameters OPint of the device under test 2 when using different kinds of 5G communication services.

In a possible embodiment, the test apparatus 1 comprises an input unit which allows a user to select between test modes for testing the device under test 2. The test apparatus 1 can comprise in a possible embodiment a graphical user interface adapted to output data and to input control commands. In a possible embodiment, a user or a test person can test the device under test 2 in different test operation modes under different test conditions. In a possible embodiment, the test person can set a sequence of different communication services used by the device under test 2 during a communication session with the transceiver unit 3. Further, the test person can set environmental operation parameters such as pressure or temperature within the test chamber 6. Further, the test person can select one or several operation parameters of the device under test 2 to be observed during the test procedure. For instance, the test person may select a battery state of an internal power source of the device under test 2 to be measured by the processing unit 4 during the communication session. The processing unit 4 of the test apparatus can then calculate the impact of different communication services CS on the operation parameters selected by the user.

In a further possible embodiment, the processing unit 4 is adapted to emulate another device under test 2 communicating with the device under test 2 under observation. In this way, machine-to-machine communication services between different devices can be emulated and analyzed. The test apparatus 1 can analyze the data to optimize networks and/or devices communicating with each other, for instance by minimizing the power consumption of devices. The test apparatus 1 can further simulate different 5G communication scenarios to optimize the communication behavior of the device under test 2. In a possible embodiment, the test apparatus 1 is adapted to simulate different use cases such as car-to-car communication or a massive distribution of sensors and actuators, a virtual reality office and urban communication or broadband access.

In a further possible embodiment of the test apparatus 1, the device under test 2 is moved under the control of the test apparatus 1 during communication with the transceiver unit 3. In this embodiment, the impact of the movement of the device under test 2 on the communication behavior of the device under test 2 can be simulated or tested. In this embodiment, the test apparatus 1 can control the velocity and direction of the device under test 2 during communication via the wireless link WL.

In a further possible embodiment, the output unit 5 of the test apparatus 1 can comprise indication means adapted to indicate a 5G communication flavor used by the communication device 2. The indication means can comprise a multicolor LED with different flash patterns. The LED may for instance show different flavors in different colors. For instance, an enhanced mobile broadband communication service which is momentarily used by the device under test 2 may be indicated by a yellow color, a massive machine-type communication service used by the device under test 2 can be indicated by a green LED and an ultrareliable machine-type communication service can be indicated by a red color. The indication means can comprise in a further possible implementation also a vibration alarm unit. Further, the monitored 5G communication flavor can also be indicated by at least one bit in a layer 1, 2 or 3 message output by the output unit 5 of the test apparatus 1. It is possible that at least two different communication flavors can be used by a device under test 2 in parallel. In a possible embodiment, the output unit 5 can send an indication message comprising one or several indication bits to a remote processing unit via a data network for further processing.

In a possible embodiment, the test apparatus 1 can be a mobile device which can be carried in the field or located in a test laboratory. In a possible embodiment, the test apparatus 1 can be connected via a data interface to a data network such as the internet. In this way, the test apparatus 1 can be connected to a remote processing unit or analyzing unit which is adapted to analyze the operation parameters of the test apparatus 1 using different kinds of calculation algorithms.

In a further possible embodiment, the test apparatus 1 can be adapted to test several devices under test 2 in parallel. For instance, the test apparatus 1 can be adapted to emulate a base station communicating with different mobile devices 2 simultaneously. In a further alternative embodiment, the test apparatus 1 can be adapted to simulate a further device under test 2 communicating with several other devices under test 2 simultaneously.

The invention claimed is:

1. A test apparatus for testing a wireless device, said test apparatus comprising:
   a transceiver unit adapted to communicate with said device under test, DUT, via a wireless link;
   a processing unit adapted to control said transceiver unit and to detect a communication service used by said device under test, DUT, during communication with said transceiver unit; and
   an output unit adapted to output the communication service detected by said processing unit, wherein the communication service is a 5G communication service comprising:
   an enhanced mobile broadband communication service, eMBB,
   a massive machine-type communication service, mMTC, and/or
   an ultrareliable machine-type communication service, uMTC.

2. The test apparatus according to claim 1 wherein the test apparatus comprises an anechoic chamber adapted to receive the device under test, DUT.

3. The test apparatus according to claim 2 wherein the transceiver unit is connected to at least one antenna located within said anechoic chamber to communicate with said device under test, DUT, via the wireless link.

4. The test apparatus according to claim 2 wherein an interior surface of the anechoic chamber is covered with radiation absorbent material.

5. The test apparatus according to claim 1 wherein the processing unit of said test apparatus is adapted to emulate a base station or another device under test, DUT, during communication with said device under test, DUT, via the wireless link.

6. The test apparatus according to claim 1 wherein the wireless link is a bidirectional wireless link comprising an uplink communication link connecting a transmitter of said device under test, DUT, with the transceiver unit of said test apparatus and a downlink communication link connecting the transceiver unit of said test apparatus with a receiver of said device under test, DUT.

7. The test apparatus according to claim 1 wherein the processing unit of said test apparatus is adapted to detect a sequence of different communication services used by said device under test, DUT, during communication with the transceiver unit of said test apparatus.

8. The test apparatus according to claim 7 wherein the processing unit of said test apparatus is adapted to control the transceiver unit of said test apparatus and/or the device under test, DUT, to trigger changes of the communication services used by said device under test, DUT, during communication with said transceiver unit.

9. The test apparatus according to claim 7 wherein the processing unit of said test apparatus is adapted to monitor an operation mode and/or at least one operation parameter of said device under test, DUT, depending on the detected sequence of different communication services used by said device under test, DUT, during communication with the transceiver unit of said test apparatus.

10. The test apparatus according to claim 1 wherein the processing unit of said test apparatus is adapted to detect communication protocols of the communication services used by the device under test, DUT, during communication with the transceiver unit of said test apparatus.

11. The test apparatus according to claim 10 wherein messages or packets transmitted via the wireless link according to the communication protocols of the communication services used by the device under test, DUT, during communication with the transceiver unit of said test apparatus comprise at least one service indication data field indicating the used communication service.

12. The test apparatus according to claim 11 wherein the processing unit is adapted to extract the data content of the at least one service indication data field to detect the used communication service.

13. The test apparatus according to claim 1 wherein the output unit of said test apparatus is adapted to output and/or to register the detected communication services and/or the monitored operation modes and/or monitored operation parameters of the device under test, DUT, during communication of the device under test, DUT, with the transceiver unit of said test apparatus.

14. The test apparatus according to claim 1 wherein a communication frequency used by the communication service is in a frequency range of 28 GHz to 30 GHz.

15. The test apparatus according to claim 1, wherein a communication bandwidth used by the communication service is in a range of 800 MHz to 3 GHz.

16. A method for testing a wireless device comprising the steps of:
 (a) communicating with the device under test, DUT, via a wireless link;
 (b) detecting a communication service used by the device under test, DUT, during communication via the wireless link; and
 (c) outputting the detected communication service, wherein the communication service is a 5G communication service comprising
  an enhanced mobile broadband communication service, and/or
  a massive machine-type communication service and/or
  an ultrareliable machine-type communication service.

17. The method according to claim 16 wherein the communication frequency used by the communication service is in a frequency range of 28 GHz to 30 GHz and wherein a communication bandwidth used by the communication service is in a range of 800 MHz to 3 GHz.

* * * * *